US011150702B2

(12) United States Patent
Kang

(10) Patent No.: US 11,150,702 B2
(45) Date of Patent: Oct. 19, 2021

(54) ELECTRONIC APPARATUS AND METHOD FOR CONTROLLING THEREOF

(71) Applicant: SAMSUNG ELECTRONICS CO., LTD., Suwon-si (KR)

(72) Inventor: Jeongil Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 267 days.

(21) Appl. No.: 16/240,891

(22) Filed: Jan. 7, 2019

(65) Prior Publication Data
US 2019/0235583 A1 Aug. 1, 2019

(30) Foreign Application Priority Data

Jan. 29, 2018 (KR) .................. 10-2018-0010919

(51) Int. Cl.
H02J 50/10 (2016.01)
G06F 1/16 (2006.01)
H02J 7/02 (2016.01)

(52) U.S. Cl.
CPC .......... G06F 1/1683 (2013.01); G06F 1/1688 (2013.01); G06F 1/1698 (2013.01); H02J 7/025 (2013.01); H02J 50/10 (2016.02)

(58) Field of Classification Search
None
See application file for complete search history.

(56) References Cited

U.S. PATENT DOCUMENTS

| 9,763,271 | B1 | 9/2017 | Gabel |
| 2004/0160791 | A1 | 8/2004 | Haus et al. |
| 2007/0293271 | A1 | 12/2007 | Streeter |
| 2011/0069055 | A1 | 3/2011 | Jung et al. |
| 2013/0076155 | A1 | 3/2013 | Yu et al. |
| 2013/0083249 | A1* | 4/2013 | Nonomura ............... H04N 5/64 348/725 |

(Continued)

FOREIGN PATENT DOCUMENTS

| JP | 4168145 B2 | 10/2008 |
| JP | 5513682 B2 | 6/2014 |

(Continued)

OTHER PUBLICATIONS

International Search Report (PCT/ISA/210), issued by International Searching Authority in corresponding International Application No. PCT/KR2019/000630, dated May 8, 2019.

(Continued)

Primary Examiner — Jared Fureman
Assistant Examiner — Aqeel H Bukhari
(74) Attorney, Agent, or Firm — Sughrue Mion, PLLC

(57) ABSTRACT

An electronic apparatus includes a coupler to which an external apparatus is detachably attached, an interface, a wireless power transmitter; a communicator; and a processor configured to control the wireless power transmitter to transmit power received from an external apparatus that is connected through the interface to a display panel of the external electronic apparatus that is attached through the coupler, and control the communicator to transmit a video signal received from an external apparatus which is connected through the interface to the display panel.

20 Claims, 10 Drawing Sheets

(56) References Cited

U.S. PATENT DOCUMENTS

| | | | | |
|---|---|---|---|---|
| 2013/0307468 | A1* | 11/2013 | Lee | H02J 50/90 |
| | | | | 320/108 |
| 2014/0145515 | A1* | 5/2014 | Jung | H02J 7/025 |
| | | | | 307/104 |
| 2015/0180355 | A1 | 6/2015 | Freeman et al. | |
| 2016/0072327 | A1* | 3/2016 | Knutson | G06F 1/1632 |
| | | | | 320/108 |
| 2016/0111028 | A1 | 4/2016 | Lee et al. | |

FOREIGN PATENT DOCUMENTS

| | | | |
|---|---|---|---|
| KR | 10-2010-0087712 | A | 8/2010 |
| KR | 10-1253565 | B1 | 4/2013 |
| KR | 10-2014-0011755 | A | 1/2014 |
| KR | 10-1419771 | B1 | 7/2014 |
| KR | 10-2015-0097467 | A | 8/2015 |
| KR | 10-2017-0048056 | A | 5/2017 |
| KR | 10-2017-0101969 | A | 9/2017 |
| WO | 2009/047768 | A2 | 4/2009 |
| WO | 2016/109327 | A1 | 7/2016 |

OTHER PUBLICATIONS

Written Opinion (PCT/ISA/237) issued by the International Searching Authority in corresponding International Application No. PCT/KR2019/000630, dated May 8, 2019.

* cited by examiner

ELECTRONIC APPARATUS AND METHOD FOR CONTROLLING THEREOF

CROSS-REFERENCE TO RELATED APPLICATIONS

This application is based on and claims priority under 35 U.S.C. § 119 to Korean Patent Application No. 10-2018-0010919, filed on Jan. 29, 2018, in the Korean Intellectual Property Office, the disclosure of which is incorporated by reference herein in its entirety.

BACKGROUND

1. Field

The disclosure relates to an electronic apparatus and a method for controlling thereof and, more particularly, to an electronic apparatus to which various external apparatus can be attached, and a method for controlling thereof.

2. Description of the Related Art

With development of technologies, various electronic apparatuses such as a TV, computer, and notebook have been developed.

However, generally electronic apparatuses such as TVs are provided as finished products combined with display panels and speakers. Accordingly, when a user desires to receive a higher quality picture or sound, there is a problem that the TV itself needs to be replaced.

Recently, it is a trend that electronic apparatuses such as TVs are installed at each independent space in a house.

When a plurality of TVs are installed, not only a space is limited, but also an economical problem of purchasing a plurality of TVs cannot be ignored.

SUMMARY

Embodiments may overcome the above disadvantages and other disadvantages not described above. However, it is understood that the embodiments are not required to overcome the disadvantages described above, and may not overcome any of the problems described above.

In accordance with an aspect of the disclosure, there is provided an electronic apparatus to which a display panel or a speaker is detachably attached, and a method for controlling thereof.

In accordance with an aspect of the disclosure, there is provided an electronic apparatus, including: a coupler configured to be detachably attached to an external electronic apparatus; an interface; a wireless power transmitter; a communicator; and a processor configured to: control the wireless power transmitter to transmit power received from an external apparatus that is connected through the interface to a display panel of the external electronic apparatus that is attached through the coupler, and control the communicator to transmit a video signal received from the external apparatus to the display panel.

The coupler may include at least one coupling groove that is coupled to at least one coupling protrusion of the display panel.

The communicator may include a wireless communication chip, and wherein the processor may be further configured to wirelessly transmit the video signal received from the external apparatus to the display panel through the wireless communication chip.

The electronic apparatus may further include a magnetic switch, wherein the processor may be further configured to, when the display panel is coupled to the coupler and the magnetic switch is turned on, transmit power received from the external apparatus to the display panel.

The coupler may be coupled to a speaker, and wherein the processor may be further configured to: control the wireless power transmitter to transmit power received from the external apparatus to the speaker which may be coupled through the coupler, and control the communicator to transmit, to the speaker, an audio signal received from the external apparatus.

The coupler may include at least two coupling grooves, and wherein a coupling groove of a part of the coupler may be coupled to a coupling protrusion of the display panel, and a coupling groove of another part of the coupler may be coupled to a coupling protrusion of the speaker.

The wireless power transmitter may include a first wireless power transmitter configured to transmit power to the display panel and a second wireless power transmitter configured to transmit power to the speaker, and wherein the processor may be further configured to wirelessly transmit, to the display panel, power received from the external apparatus through the first wireless power transmitter, and wirelessly transmit, to the speaker, power received from the external apparatus through the second wireless power transmitter.

The communicator may include a wireless communication chip, and wherein the processor may be further configured to wirelessly transmit an audio signal received from the external apparatus to the speaker through the wireless communication chip.

The electronic apparatus may further include a first magnetic switch; and a second magnetic switch, wherein the processor may be further configured to, when the display panel is coupled to the coupler and the first magnetic switch is turned on, transmit power, to the display panel, received from the external apparatus, and when the speaker is coupled to the coupler and the second magnetic switch is turned on, transmit, to the speaker, power received from the external apparatus.

The electronic apparatus may further include a first transistor, a second transistor, a third transistor, a fourth transistor, a fifth transistor, and a sixth transistor; and an inverter integrated circuit (IC) configured to control a switching operation of the first transistor, the second transistor, the third transistor, the fourth transistor, the fifth transistor, and the sixth transistor, wherein the first wireless power transmitter may be configured to, when the display panel is coupled to the coupler and a first magnetic switch is turned on, generate wireless power according to a switching operation of the first transistor, the second transistor, the third transistor, and the fourth transistor controlled by the inverter IC, and wherein the second wireless power transmitter may be configured to, when the speaker is coupled to the coupler and a second magnetic switch is turned on, generate wireless power according to a switching operation of the first transistor, the second transistor, the fifth transistor, and the sixth transistor controlled by the inverter IC.

In accordance with an aspect of the disclosure, there is provided a method for controlling an electronic apparatus, the method including: transmitting power received from an external apparatus that is connected to the electronic apparatus to a display panel that is attached through a coupler of the electronic apparatus; and transmitting a video signal received from the external apparatus to the display panel.

The coupler may include at least one coupling groove that is coupled to at least one coupling protrusion of the display panel.

The transmitting the video signal may include wirelessly transmitting the video signal received from the external apparatus to the display panel through a wireless communication chip.

The transmitting power may include, when the display panel is coupled to the coupler and a magnetic switch is turned on, transmitting power received from the external apparatus to the display panel.

The coupler may be coupled to a speaker, and wherein the method may further include: transmitting power received from the external apparatus to the speaker which may be coupled through the coupler; and transmitting, to the speaker, an audio signal received from the external apparatus.

The coupler may include at least two coupling grooves, and wherein a coupling groove of a part of the coupler may be coupled to a coupling protrusion of the display panel, and a coupling groove of another part of the coupler may be coupled to a coupling protrusion of the speaker.

The transmitting power may include wirelessly transmitting, to the display panel, power received from the external apparatus through a first wireless power transmitter, and wirelessly transmitting, to the speaker, power received from the external apparatus through a second wireless power transmitter.

The transmitting the audio signal may include wirelessly transmitting an audio signal received from the external apparatus to the speaker through a wireless communication chip.

The transmitting power may include: when the display panel is coupled to the coupler and a first magnetic switch is turned on, transmitting power, to the display panel, received from the external apparatus, and when the speaker is coupled to the coupler and a second magnetic switch is turned on, transmitting, to the speaker, power received from the external apparatus.

The transmitting power may include, when the display panel is coupled to the coupler and a first magnetic switch is turned on, generating wireless power according to a switching operation of a first transistor, a second transistor, a third transistor, and a fourth transistor controlled by an inverter integrated circuit (IC), and when the speaker is coupled to the coupler and a second magnetic switch is turned on, generating wireless power according to a switching operation of the first transistor, the second transistor, a fifth transistor, and a sixth transistor transistors controlled by the inverter IC.

According to various embodiments, an electronic apparatus to which a display panel or a speaker is detachably attached and a method for controlling thereof can be provided.

Accordingly, when a user wishes to replace a display panel, a user does not need to replace a speaker and can merely replace a display panel to a display panel with a desired specification. This is the same for a speaker.

In addition, by detaching a display panel and a speaker from an electronic apparatus and attaching the display panel and the speaker to an electronic apparatus in another space, there may be an effect as if a plurality of TVs are installed with only one TV.

BRIEF DESCRIPTION OF THE DRAWINGS

The above and/or other aspects will be more apparent by describing in detail embodiments with reference to the accompanying drawings, in which.

DETAILED DESCRIPTION

The terms used in the Specification and claims have chosen generic terms in view of their function in various embodiments of the disclosure. However, these terms may vary depending on the intentions, legal or technical interpretations of the artisan skilled in the art, and the emergence of new technologies. In addition, some terms may be arbitrarily selected. These terms may be construed in the meaning defined herein and, unless otherwise specified, may be construed on the basis of the entire contents of this disclosure and common technical knowledge in the art.

In addition, in the following description, detailed descriptions of well-known functions or configurations will be omitted since they would unnecessarily obscure the subject matters of the present disclosure.

Furthermore, the embodiments have been described in greater detail with reference to the attached drawings, but the disclosure is not limited thereto.

Figure 1:
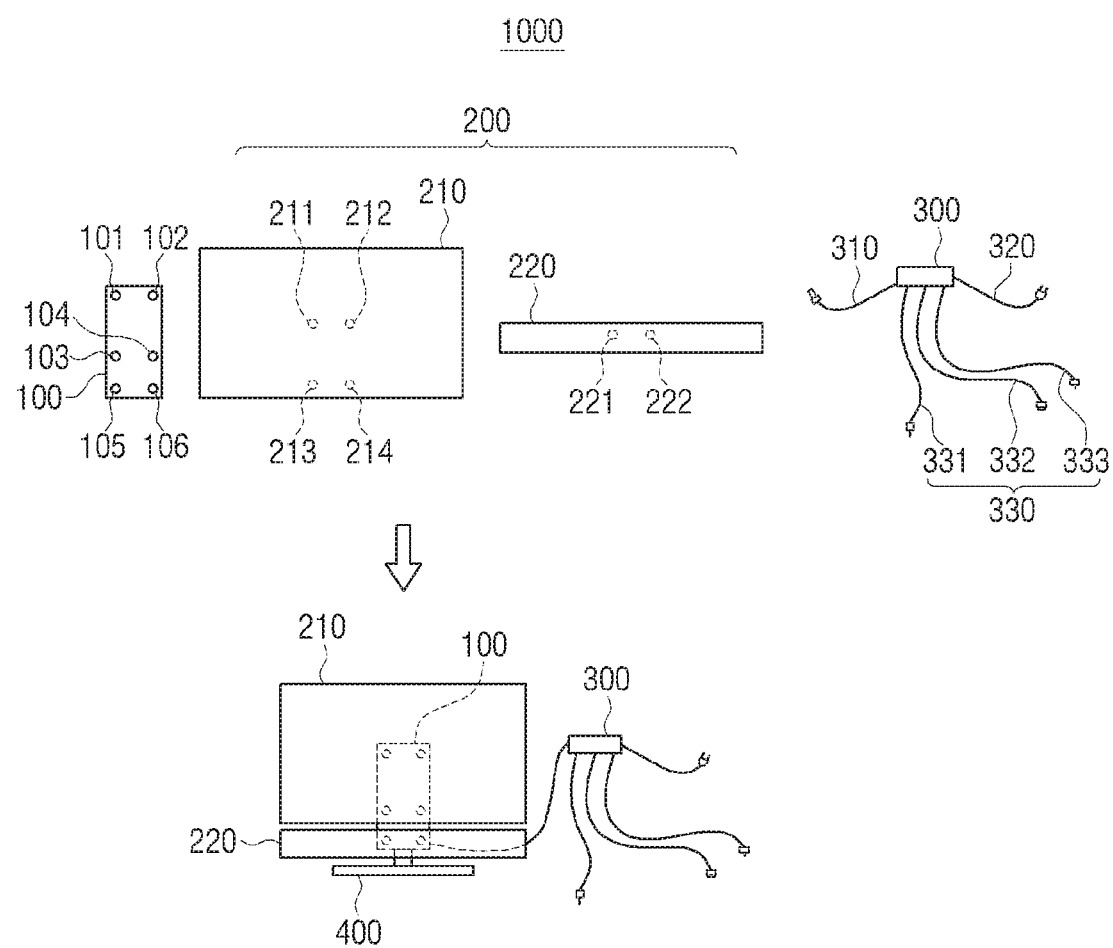
FIG. 1 is a view illustrating an electronic system, according to an embodiment.

FIG. 1 is a view illustrating an electronic system according to an embodiment.

Referring to FIG. 1, an electronic system 1000 according to an embodiment may include an electronic apparatus 100, an external electronic apparatus 200, and an external apparatus 300.

The external apparatus 300 can be connected to the electronic apparatus 100.

Specifically, the external apparatus 300 can be connected to the electronic apparatus 100 via a cable. Here, the cable may be embodied as a composite cable 310 including a cable capable of transmitting electric power and a cable capable of transmitting a signal. According to an embodiment, a cable capable of transmitting power can be a copper wire, and a cable capable of transmitting a signal can be an optical fiber.

However, this is only an embodiment, and the external apparatus 300 can be connected to the electronic apparatus 100 in various ways. For example, the external apparatus 300 may be connected to the electronic apparatus 100 through each cable capable of transmitting power and a cable capable of transmitting signals. Also, the external apparatus 300 may be connected to the electronic apparatus 100 by wireless.

Hereinbelow, it is assumed that the external apparatus 300 is connected to the electronic apparatus 100 through a composite cable 310.

The external apparatus 300 may transmit power and signals to the electronic apparatus 100. Specifically, the external apparatus 300 may transmit power and signals through the composite cable 310 coupled to the electronic apparatus 100.

To this end, the external apparatus 300 may further include a first cable 320 for receiving power and at least one second cable 330 for receiving signals from an external source. Here, the first cable 320 for receiving power may be an alternating current (AC) code or the like, and the second cable 330 for receiving signals from an external source may be a radio frequency (RF) cable 301, a universal serial bus (USB) cable 332, a high definition multimedia interface (HDMI) cable 333 or the like.

To be specific, when power is received through the first cable 320 such as the AC code cable, the received power can be transmitted to the electronic apparatus 100 through the composite cable 310 connected to the electronic apparatus 100.

The external apparatus 300, if a signal is received through a second cable 303 such as the RF cable 331, may transmit the received signal to the electronic apparatus 100 through the composite cable 310 connected to the electronic apparatus 100. Here, the signal can be a video signal or an audio signal.

For example, when an external source is a set-top box and the external apparatus 300 receives the broadcast image from the set-top box, the external apparatus 300 can transmit the video signal and the audio signal to the electronic apparatus 100. When the external source is a smartphone and the external apparatus 300 receives an audio signal for music reproduction from the smartphone, the external apparatus may transmit the audio signal to the electronic apparatus 100.

That is, the external apparatus 300 can transmit the video signal and the audio signal together with the signal received from the external source to the electronic apparatus 100, and can transmit only one of the video signal and the audio signal to the electronic apparatus 100.

The external electronic apparatus 200 may be various electronic apparatuses.

For example, the external electronic apparatus 200 can be a display panel 210.

Here, the display panel 210 may include various types of display panels such as a liquid crystal display panel (LCD), an organic light emitting diode (OLED), a liquid crystal on silicon (LCoS), a digital light processing (DLP). The display panel 210 may also include a driving circuit which can be implemented as a type such as a-si TFT, low temperature poly silicon (LTPS) TFT, organic TFT (OTFT), and a backlight unit, or the like.

Also, the external electronic apparatus 200 may be a speaker 220 or a display panel having a built-in speaker. That is, the type of external electronic apparatus 200 according to an embodiment is not limited. For example, the external electronic apparatus 200 may be a variety of electronic apparatus, such as tablets, electronic frames, or electronic mirrors.

The external electronic apparatus 200 can be detachably attached to the electronic apparatus 100 in various ways. To this end, the electronic apparatus 100 may include a coupler to which the external electronic apparatus 200 is detachably attached.

In an embodiment, when the coupler of the electronic apparatus 100 is implemented as coupling grooves 101 to 106, coupling projections 211 to 214 of the display panel 210 are engaged with the coupling grooves 101 to 104 of the electronic apparatus 100, so that the display panel 210 can be attached to the electronic apparatus 100. Alternatively, when the coupler of the electronic apparatus 100 is implemented as a coupling protrusion, the coupling groove of the display panel 210 is coupled to the coupling protrusion of the electronic apparatus 100, and the display panel 210 can be attached to the electronic apparatus 100.

The speaker 220 can also be detachably attached to the electronic apparatus 100 in the same manner. As an embodiment, the coupling protrusions 221 and 222 of the speaker 220 are coupled to the coupling grooves 105 and 106 of the electronic apparatus 100, and the speaker 220 can be attached to the electronic apparatus 100.

The foregoing will be further described with reference to FIGS. 2A and 2B.

Referring to FIG. 1, an electronic system 1000 according to an embodiment of the disclosure may further include a stand 400. Here, the stand may be integrated into the electronic apparatus 100, or may be detached from or attached to the electronic apparatus 100, like the external electronic apparatus 200. Here, the stand may serve to stand the electronic apparatus 100 on a floor surface.

In FIG. 1, the display panel 210 and the speaker 220 are respectively coupled to the electronic apparatus 100. However, in case of a display panel having an embedded speaker, the separate speaker 220 may not be coupled to the electronic apparatus 100.

Hereinafter, for convenience of description, it is assumed that the electronic apparatus 100 includes six coupling grooves 101 to 106, but this is only an example, and the number of coupling grooves is not limited thereto.

According to an embodiment as described above, in the case of a user who wishes to watch a high-quality video, the user can selectively purchase only the display panel without need to purchase a display device in which a display panel and a speaker are integrated. Accordingly, there is an effect that the present device can be used along with an existing speaker.

Likewise, in case of a user who desires high-quality audio output, the user can selectively purchase a speaker only and can use the speaker along with an existing display panel.

Also, with only one display panel and speaker, there may be an effect as if there are a plurality of display devices such as a TV at home. After having a plurality of electronic apparatuses 100 at each room, by attaching and detaching the apparatuses, a display panel and a speaker can be simply moved.

Figure 2A:
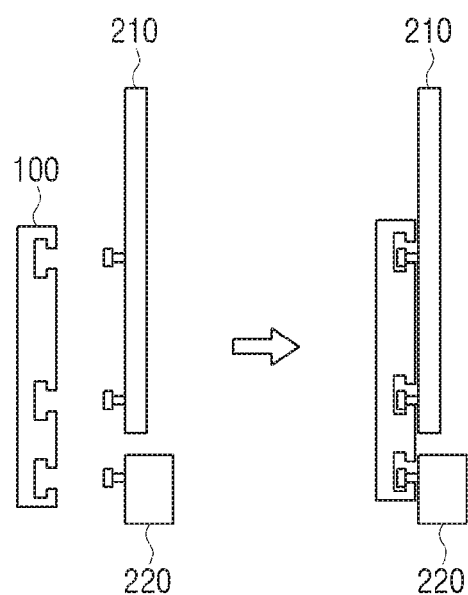
FIGS. 2A and 2B are views illustrating a method for detachably attaching an external electronic apparatus to an electronic apparatus, according to an embodiment.
Figure 2B:
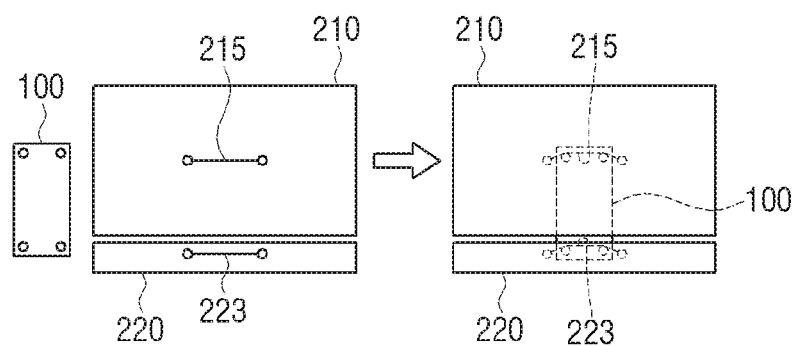

FIGS. 2A and 2B are views illustrating a method for detachably attaching an external electronic apparatus to an electronic apparatus according to an embodiment.

The external electronic apparatus 200 can be attached to or detached from the electronic apparatus 100. To this end, the electronic apparatus 100 may include a coupler. Here, the coupler can be configured in various shapes.

FIG. 2A is a view illustrating a side surface of the electronic apparatus 100, the display panel 210, and the speaker 220.

Referring to FIG. 2A, the coupler of the electronic apparatus 100 may be implemented with at least one coupling groove. In this case, the engaging groove of the electronic apparatus 100 and the engaging projection of the external electronic apparatus 200 are engaged or disengaged, and the electronic apparatus 100 and the external electronic apparatus 200 can be detached and attached. As illustrated in FIG. 2A, the external electronic apparatus 200 may be the display panel 210 and the speaker 220.

Also, conversely, the coupler can be implemented with at least one coupling protrusion. In this case, the coupling protrusion of the electronic apparatus 100 and the coupling groove of the external electronic apparatus 200 are coupled or disconnected, and the electronic apparatus 100 and the external electronic apparatus 200 can be detached or attached.

In FIG. 2A, a plurality of coupling grooves are illustrated, but this is exemplary, and a coupler can be implemented as one coupling groove.

The external electronic apparatus 200 can be attached to or detached from the electronic apparatus 100 through a string.

For this, referring to FIG. 2B, the display panel 210 may include at least two protrusions. The display panel 210 is attached to or detached from the electronic apparatus 100 by placing or putting down the string 215 connected to at least two projections of the display panel 210 on at least two projections of the electronic apparatus 100.

Similarly, even in the case of the speaker 220, by placing or putting down the string 223 connected to at least two protrusions included in the speaker 220 on at least two protrusions of the electronic apparatus 100, the speaker 220 can be attached to or detached from the electronic apparatus 100.

However, this is only an embodiment, and there is no limit to the type of the method for detaching or attaching the external electronic apparatus 200 to the electronic apparatus 100. For example, the electronic apparatus 100 and the external electronic apparatus 200 may be detached or attached through a magnet.

Figure 3:
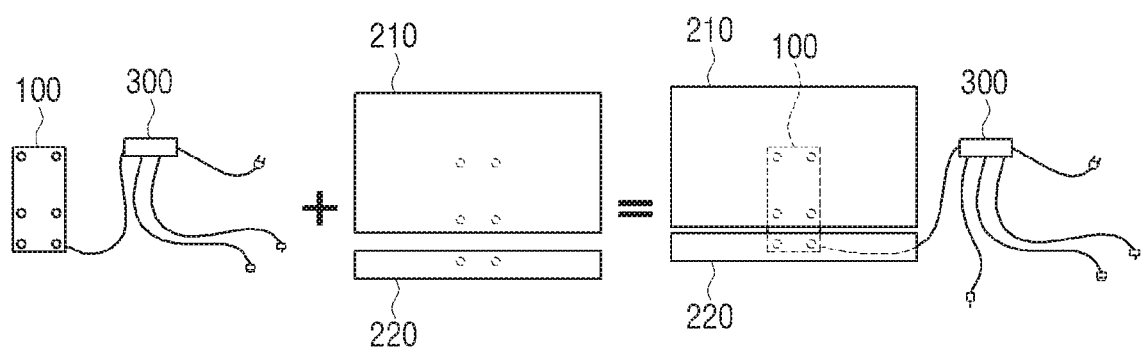
FIG. 3 is a view illustrating an embodiment of a case to fix an electronic apparatus to a wall, according to an embodiment.

FIG. 3 is a view illustrating an embodiment of a case to fix an electronic apparatus to a wall according to an embodiment.

Referring to FIG. 3, the electronic apparatus 100 can be fixed on a wall. To do this, a back side of the electronic apparatus 100 can be configured to be coupled to an anchor fixed to a wall.

The external electronic apparatus 200 can be detached from or attached to the electronic apparatus 100 by various methods as shown above. As an embodiment, when a coupler of the electronic apparatus 100 is configured as a coupling groove, the coupling protrusion of the external electronic apparatus 200 is coupled to the coupling groove of the electronic apparatus 100, and the external electronic apparatus 200 can be attached to the electronic apparatus 100.

Accordingly, there is an effect as if a general TV is installed as a wall-hanging TV.

Figure 4:
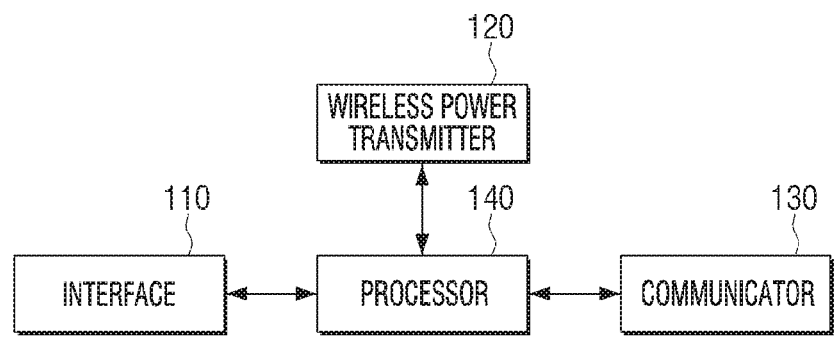
FIG. 4 is a block diagram illustrating an electronic apparatus according to an embodiment.

FIG. 4 is a block diagram illustrating an electronic apparatus according to an embodiment.

Referring to FIG. 4, the electronic apparatus 100 according to an embodiment may include an interface 110, a wireless power transmitter 120, a communicator 130, and a processor 140.

The interface 110 may be connected to an external apparatus 300. To be specific, the interface 110 may be connected to the external apparatus 300 through a composite cable.

Accordingly, the electronic apparatus 100 may receive power from the external apparatus 300 which is connected through the interface 110. Alternatively, the electronic apparatus 100 may receive a signal from the external apparatus 300 connected through the interface 110. Here, the signal can be a video signal or an audio signal.

For this, the interface 110 may include a terminal to which the composite cable can be connected.

This is merely exemplary, and the interface 110 may be configured as various types of terminals. For example, the interface 110 may include at least one of a high-definition multimedia interface (HDMI) input terminal, a component input terminal, an RF input terminal, a PC input terminal, and a USB input terminal.

The wireless power transmitter 120 may transmit power to the external electronic apparatus 200.

To be specific, the wireless power transmitter 120 may wirelessly transmit power received from the external apparatus 300 which is connected through the interface 110 to the external electronic apparatus 200 which is attached through a coupler.

Here, the wireless power transmitter 120 may be configured as a power transmission antenna. To be specific, the wireless power transmitter 120 may be a loop antenna in which coil is wound in a circular shape.

Meanwhile, the electronic apparatus 100 according to an embodiment may include a plurality of wireless power transmitters 120. For example, when the electronic apparatus 100 is implemented in a structure in which a display panel and a speaker can be coupled, the electronic apparatus 100 may include a first wireless power transmitter capable of transmitting power to the display panel 210 and a second wireless power transmitter capable of transmitting power to the speaker 220.

Meanwhile, the external electronic apparatus 200 may include a wireless power receiver. The wireless power receiver of the external electronic apparatus 200 may receive power from the wireless power transmitter of the electronic apparatus 100. Here, the wireless power receiver may be a loop antenna in which the coil is wound in a circular shape like the wireless power transmitter of the electronic apparatus 100.

The communicator 130 may communicate with various shapes of external apparatuses according to various types of communication methods.

The communicator 130 may communicate with the external electronic apparatus 200 and transmit a signal to the external electronic apparatus 200. Here, the signal may be a video signal or an audio signal.

Specifically, when a video signal is received from the external apparatus 300 through the composite cable, the communicator 130 can transmit the video signal to the display panel 210 attached to the electronic apparatus 100. The communicator 130 may, when the audio signal is received from the external apparatus 300 through the composite table, transmit the audio signal to the speaker 220 attached to the electronic apparatus 100.

To do this, the communicator 130 may include a wireless communication chip such as Wi-Fi chip and Bluetooth chip, etc.

The processor 140 controls overall operations of the electronic apparatus 100. To do this, the processor 140 may include at least one of a central processing unit (CPU), an application processor (AP), or a communication processor (CP).

The processor 140 may control the wireless power transmitter 120 so as to transmit power received from the external apparatus 300 to the external electronic apparatus 200.

To be specific, the processor 140, when power is received from the external apparatus 300 through the interface 110, may control the wireless power transmitter 120 so as to transmit the received power to the external electronic apparatus 200. Here, the external electronic apparatus 200 may be not only a display panel but also various electronic apparatuses such as a speaker.

Accordingly, the external electronic apparatus 200 can be turned on using power received from the electronic apparatus 100.

The processor 140 may control the communicator 130 to transmit a signal received from the external apparatus 300 to the external electronic apparatus 200.

To be specific, the processor 140 may, when a signal is received from the external apparatus 300 through the interface 110, control the communicator 130. Here, the signal may be a video signal or an audio signal.

For example, when a video signal is received from the external electronic apparatus 300, the processor 140 may control the communicator 130 to transmit a video signal received from the external electronic apparatus 300 to the display panel 210. When the audio signal is received from the external electronic apparatus 300, the processor 140 may control the communicator 130 to transmit the audio signal received from the external electronic apparatus 300 to the speaker 220.

Accordingly, the display panel 210 may display a video based on the video signal received from the electronic apparatus 100, and the speaker 220 may output a sound based on the audio signal received from the electronic apparatus 100.

Figure 5:
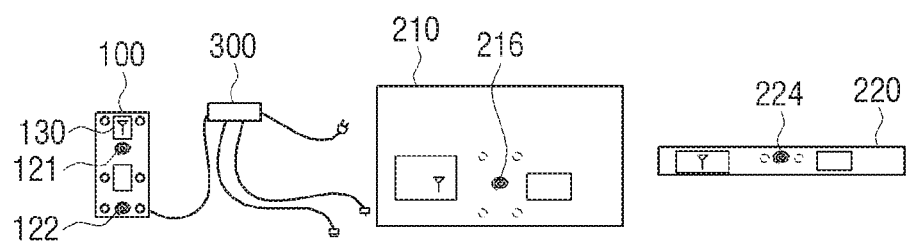
FIG. 5 is a view illustrating a structure of an electronic apparatus according to an embodiment.

FIG. 5 is a view illustrating a structure of an electronic apparatus according to an embodiment.

As described above, the electronic apparatus 100 according to an embodiment may include a first wireless power transmitter, a second wireless power transmitter, and a communicator.

Referring to FIG. 5, when the display panel 210 is attached to the electronic apparatus 100, the first wireless power transmitter 121 may be located in an area in contact with the wireless power receiver 216 of the display panel. Similarly, when the speaker 220 is attached to the electronic apparatus 100, the second wireless power transmitter 122 may be located in an area in contact with the wireless power receiver 224 of the speaker. This is because the electronic apparatus 100 efficiently transmits power to the external electronic apparatus 200. When the display panel 210 is attached to the electronic apparatus 100, the first wireless power transmitter 121 may transmit power through the coil of the first wireless power transmitter 121 to the display panel 210, and when the speaker 220 is attached to the electronic apparatus 100, the second wireless power transmitter 122 may transmit power to the speaker 220 through the coil of the second wireless power transmitter 122.

The position of the first wireless power transmitter 121 and the second wireless power transmitter 122 shown in FIG. 5 and the position of the wireless power receiver 216 of the display panel and the wireless power receiver 224 of the speaker are only exemplary, and the position of each wireless power transmitter may be changed in the manufacturing process step. Likewise, the position of the communicator 130 as illustrated in FIG. 5 can be different for circumstances.

Figure 6:
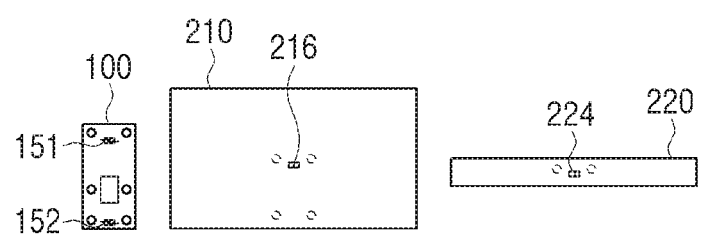
FIG. 6 is a block diagram illustrating an operation of an electronic apparatus according to an embodiment.

FIG. 6 is a block diagram illustrating an operation of an electronic apparatus according to an embodiment.

As described above, the processor 140 may control the wireless power transmitter 120 to transmit power to the external electronic apparatus 200.

In this case, the processor may control the wireless power transmitter 120 to transmit power to the external electronic apparatus 200 only when the external electronic apparatus 200 is attached to the electronic apparatus 100.

To do this, the electronic apparatus 100 according to an embodiment can further include a magnetic switch.

To be specific, the processor 140, as the external electronic apparatus 200 is attached to the electronic apparatus 100, may control the wireless power transmitter 120 so as to transmit power to the external electronic apparatus 200, when a magnetic switch of the electronic apparatus 100 is turned on by the magnet of the external electronic apparatus 200.

Thus, the electronic apparatus 100 according to an embodiment activates the wireless power transmitter 120 only when the external electronic apparatus 200 is attached to the electronic apparatus 100, thereby minimizing waste of power.

The electronic apparatus 100 according to an embodiment may include a plurality of magnetic switches.

Referring to FIG. 6, the electronic apparatus 100 according to an embodiment may include a first magnetic switch 151 and a second magnetic switch 152.

The processor 140 may control an operation of the first and second wireless power transmitters based on a switching operation of the first and second magnetic switches.

Specifically, as the display panel 210 is attached to the electronic apparatus 100, when the first magnet switch 151 is turned on by the magnet 216 of the display panel, the processor 140 may control the first wireless power transmitter 121 to transmit power to the display panel 210.

Similarly, when the second magnet switch 152 is turned on by the magnet 224 of the speaker, as the speaker 220 is attached to the electronic apparatus 100, the processor 140 may control the second wireless power transmitter 122 to transmit power to the speaker 220.

As such, the electronic apparatus 100 according to an embodiment may further minimize waste of power by independently controlling the first and second wireless power transmitters.

In FIG. 5, it is illustrated that the electronic apparatus 100 includes two magnetic switches, but this is only an embodiment. For example, when the electronic apparatus 100 is implemented in a form in which one external electronic apparatus 200 is detached or attached, the magnetic switch may be one, and when three or more external electronic apparatuses are implemented in a detachable form, magnetic switches can be three or more.

Figure 7:
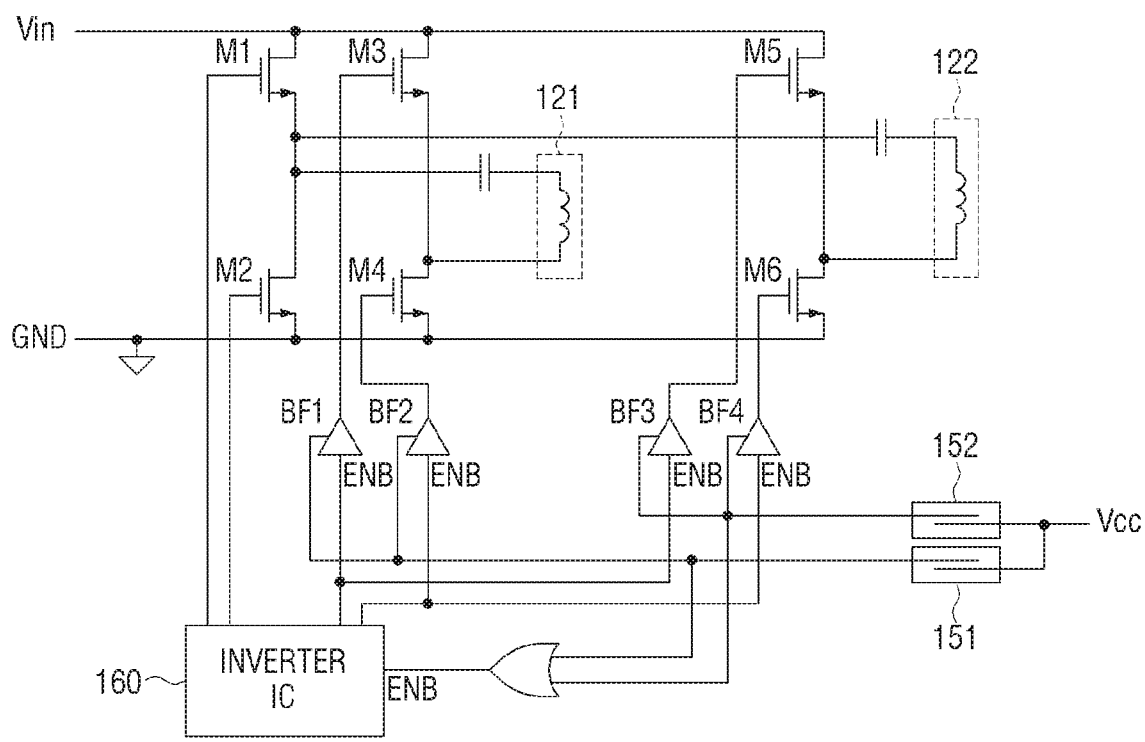
FIG. 7 is a view illustrating a circuit of an electronic apparatus according to an embodiment.

FIG. 7 is a view illustrating a circuit of an electronic apparatus according to an embodiment.

In general, in order to operate a power transmission antenna, four transistors are required, in order to alternately supply voltage of opposite phase to the power transmission antenna.

Accordingly, when two power transmission antennas are included in the electronic apparatus, a total of eight transistors are required, causing problems of increase in size of an electronic apparatus and increase in cost.

In order to solve such a problem, the electronic apparatus 100 according to an embodiment may be configured to control a power transmission antenna through a total of six transistors even when two power transmission antennas are included in the electronic apparatus.

Referring to FIG. 7, first to fourth transistors M1 to M4 are connected to the first power transmission antenna 121, and the first, second, fifth, and sixth transistors M1. M2, M5, and M6 may be coupled to the second power transmission antenna 122. That is, the first and second transistors M1 and M2 may be connected to both the first and second wireless transmitters 121 and 122.

The first buffer BF1 may be connected to the third transistor M3 of the first power transmission antenna 121. The second buffer BF2 may be connected to the fourth transistor M4. The buffer BF3 may be connected to the fifth transistor M5 and the fourth buffer BF4 may be connected to the sixth transistor M6.

The first magnetic switch 151 may be connected to the first buffer BF1 and second buffer BF2, and the second magnetic switch 152 may be connected to the third buffer BF3 and fourth buffer BF4.

Accordingly, the first buffer BF1 and second buffer BF2 can be enabled when the first magnetic switch 151 is turned on, and the third buffer and the fourth buffer BF3 and BF4 can be enabled when the second magnetic switch 152 is turned on.

The inverter IC 160 controls the switching operations of the first to sixth transistors M1 to M6 and may be connected to the first and second transistors M1, M2, and the first buffer BF1 to fourth buffer BF4. The inverter IC 160 may be enabled if being connected to the first and second magnetic switches 151, 152, and when at least one of the first and second magnetic switches is turned on.

In this circuit, depending on whether the first and second magnetic switches 151, 152 are turned on or not, the first and second power transmission antennas 121, 122 can transmit power to the external electronic apparatus 200. Detailed operation will be described with reference to FIG. 8.

Figure 8:
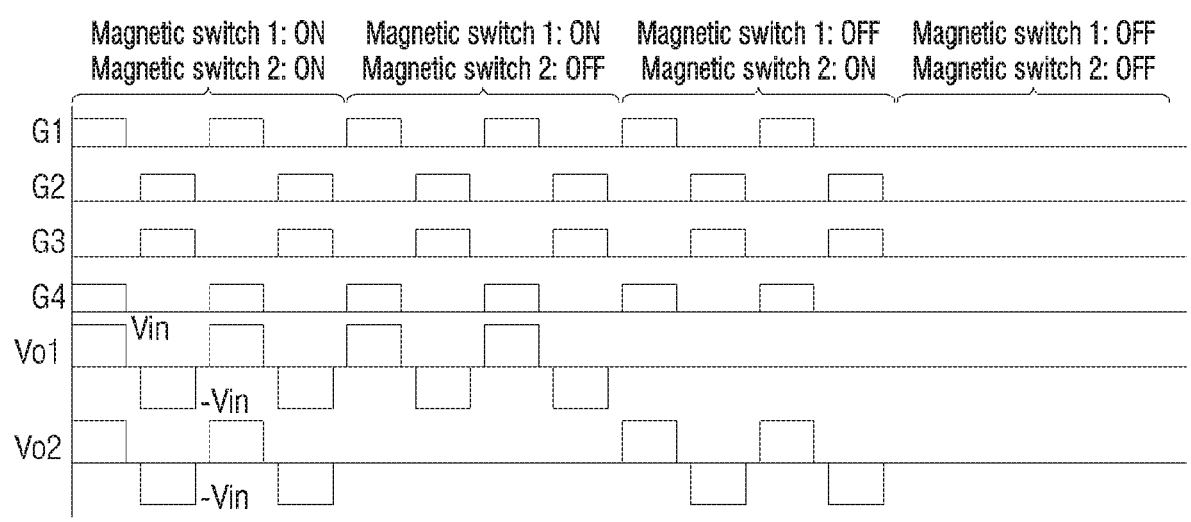
FIG. 8 is a view illustrating an operation of a circuit of an electronic apparatus according to an embodiment.

FIG. 8 is a view illustrating an operation of a circuit of an electronic apparatus according to an embodiment.

Referring to FIG. 8, the case where the first and second magnetic switches 151 and 152 are turned on will be described. When the first and second magnetic switches 151 and 152 are turned on, the first to fourth buffers BF1 to BF4 and the inverter IC 160 can be enabled as shown in FIG. 7.

The inverter IC 160 may transmit the first signal G1 to the first transistor M1 and the fourth signal G4 to the second buffer BF2 and the fourth buffer BF4 during a predetermined time interval. The inverter IC 160, then, may transmit the second signal G2 to the second transistor M2 and transmit the third signal G3 to the first buffer BF1 and the third buffer BF3 for a predetermined time interval.

At this time, since the first buffer BF1 is enabled, the third signal G3 received from the inverter IC 160 can be transmitted to the third transistor M3. Similarly, the second buffer BF2 may transmit the fourth signal G4 received from the inverter IC 160 to the fourth transistor M4, and the third buffer BF3 may transmit the third signal G3 received from the inverter IC 160 to the fifth transistor M5, the fourth buffer BF4 may transmit the fourth signal G4 received from the inverter IC 160 to the sixth transistor M6.

By repeating the signal transmission, the voltage Vo1 of the opposite phase can be alternately applied to the first power transmission antenna 121 based on a predetermined time interval. Similarly, the voltage Vo2 of the opposite phase may be alternately applied to the second power transmission antenna 122 based on a predetermined time interval.

Accordingly, the first power transmission antenna 121 and the second power transmission antenna 122 can transmit power to the external electronic apparatus 200.

Referring to FIG. 8, the case where the first magnetic switch 151 is turned on and the second magnetic switch 152 is turned off will be described. As illustrated in FIG. 7, the first and second buffers BF1, BF2, and the inverter IC 160 are enabled according to power-on of the first magnetic switch 151, and according to power-off of the second magnetic switch 152, the third buffer BF3 and fourth buffer BF4 can be disabled.

The inverter IC 160 may transmit the first signal G1 to the first transistor M and the fourth signal G4 to the second buffer BF2 and the fourth buffer BF4 during a predetermined time interval. Thereafter, the inverter IC 160 may transmit the second signal G2 to the second transistor M2, and transmit the third signal G3 to the first buffer BF1 and the third buffer BF3 for a predetermined time interval.

At this time, since the first buffer BF1 is enabled, the first buffer BF1 can transmit the third signal G3 received from the inverter IC 160 to the third transistor M3. Similarly, the second buffer BF2 may transmit the fourth signal G4 received from the inverter IC 160 to the fourth transistor M4.

However, since the third buffer BF3 is in the disabled state, the third signal G3 received from the inverter IC 160 cannot be transmitted to the fifth transistor M5. Similarly, the fourth buffer BF4 cannot transmit the fourth signal G4 received from the inverter IC 160 to the sixth transistor M6.

The voltage Vo1 of the opposite phase can be alternately applied to the first power transmission antenna 151 on the basis of the preset time interval, but the voltage of opposite phase cannot be alternately applied to the second power transmission antenna on the basis of the preset time interval.

Accordingly, the first power transmission antenna 121 may transmit power to the external electronic apparatus 200, but the second power transmission antenna 122 cannot transmit power.

Referring to FIG. 8, a case where the first magnetic switch 151 is turned off and the second magnetic switch 152 is turned on will be described. As described in FIG. 7, when the first magnetic switch 151 is turned off, the first and second buffers BF1 and BF2 are disabled. When the second magnetic switch 152 is turned on, the third and fourth buffers BF3 and BF4 may be enabled.

The inverter IC 160 may transmit the first signal G1 to the first transistor M5 and the fourth signal G4 to the second buffer BF2 and the fourth buffer BF4. The inverter IC 160 may then transmit the second signal G2 to the second transistor M2 and transmit the third signal G3 to the first buffer BF1 and the third buffer BF3 for a predetermined time interval.

At this time, since the third buffer BF3 is enabled, the third signal G3 received from the inverter IC 160 can be transmitted to the fifth transistor M5. Similarly, the fourth buffer BF4 may transmit the fourth signal G4 received from the inverter IC 160 to the sixth transistor M6.

However, since the first buffer BF1 is in the disabled state, the third signal G3 received from the inverter IC 160 cannot be transmitted to the third transistor M5. Similarly, the fourth buffer BF4 may not transmit the fourth signal G4 received from the inverter IC 160 to the fourth transistor M4.

The voltage Vo2 of the opposite phase can be alternately applied to the second power transmission antenna 122 on the basis of the preset time interval, but voltage of the opposite phase cannot be applied alternately to the first power transmission antenna 121 on the basis of the preset time interval.

Accordingly, the second power transmission antenna 212 may transmit power to the external electronic apparatus 200, but the first transmission antenna 211 cannot transmit power.

Referring to FIG. 8, the case where the first and second magnetic switches 151 and 152 are turned off will be described. As illustrated in FIG. 7, when the first and second magnetic switches 151 and 152 are turned off, the first to fourth buffers BF1 to BF4 and the inverter IC 160 may be disabled.

By the foregoing, the inverter IC 160 may not transmit signals to the respective transistors, and voltages of opposite phases may not be alternately applied to the first and second power transmission antennas 121 and 122 based on a predetermined time interval.

Accordingly, the first power transmission antenna 121 and the second power transmission antenna 122 may not transmit power.

In the meantime, here, an operation of the inverter IC 160 may be controlled by the processor 140.

Figure 9:
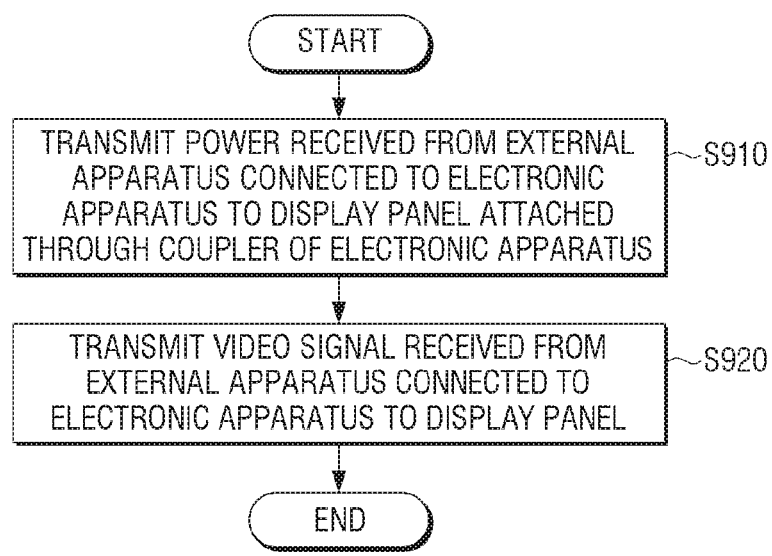
FIG. 9 is a flowchart illustrating an operation of an electronic apparatus according to an embodiment.

FIG. 9 is a flowchart illustrating an operation of an electronic apparatus according to an embodiment.

The electronic apparatus may transmit the power received from the external apparatus connected to the electronic apparatus to the attached display panel through the coupler of the electronic apparatus in step S910. Specifically, the electronic apparatus can transmit the power received from the external apparatus to the display panel when the magnetic switch of the electronic apparatus is turned on as the display panel is coupled to the coupler.

The coupler may be implemented as at least one coupling groove, and at least one coupling groove may be coupled to at least one coupling projection of the display panel, so that the display panel, which is an external electronic apparatus, can be attached to the electronic apparatus.

Then, the electronic apparatus can transmit the video signal received from the external apparatus connected to the electronic apparatus to the display panel in step S920. Here, the video signal can be wirelessly transmitted to the display panel through the wireless communication chip of the electronic apparatus.

The coupler may be coupled to a speaker. In this case, the electronic apparatus may transmit power received from the external apparatus connected to the electronic apparatus to a speaker coupled by the coupler.

In addition, the electronic apparatus can transmit the audio signal received from the external apparatus to the speaker. Here, the audio signal can be wirelessly transmitted to the speaker via the wireless communication chip of the electronic apparatus.

In this case, the coupler may be embodied as at least two coupling grooves, the coupling groove of a part of the coupler may be coupled to the coupling projection of the display panel, and the coupling groove of another part may be coupled to the coupling projection of the speaker.

Meanwhile, the methods according to various embodiments described above can be implemented in the form of software or applications that can be installed in existing electronic apparatus.

In addition, the methods according to various embodiments described above can be implemented by software upgrade, or hardware upgrade, for existing electronic apparatuses.

It is possible that various embodiments described above are performed through an embedded server of the electronic apparatus of a server outside the electronic apparatus.

Meanwhile, a non-transitory computer readable medium may be provided in which a program for sequentially performing the control method of the electronic apparatus according to the disclosure is stored.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing embodiments and advantages are merely exemplary and are not to be construed as limiting the inventive concept. The embodiments can be readily applied to other types of device or apparatus. Also, the description of the embodiments is intended to be illustrative, and not to limit the scope of the inventive concept, and many alternatives, modifications, and variations will be apparent to those skilled in the art.

What is claimed is:

1. An electronic apparatus, comprising:
a coupler configured to be detachably attached to an external electronic apparatus;
an interface;
a wireless power transmitter;
a communicator; and
a processor configured to:
control the wireless power transmitter to transmit power received from an external apparatus that is connected through the interface to the external electronic apparatus that is attached through the coupler, and
control the communicator to wirelessly transmit a video signal received from the external apparatus to the external electronic apparatus.

2. The electronic apparatus of claim 1, wherein the coupler comprises at least one coupling groove that is coupled to at least one coupling protrusion of the external electronic apparatus.

3. The electronic apparatus of claim 1, wherein the external electronic apparatus comprises a display panel, and
wherein the wherein the display panel is configured to be turned on using the power received from the electronic apparatus and display a video based on the video signal.

4. The electronic apparatus of claim 1, further comprising:
a magnetic switch,
wherein the processor is further configured to, when the external electronic apparatus is coupled to the coupler and the magnetic switch is turned on, transmit power received from the external apparatus to the external electronic apparatus.

5. The electronic apparatus of claim 1, wherein the processor is configured to control the communicator to wirelessly transmit an audio signal received from the external apparatus to the external electronic,
wherein the external electronic apparatus comprises a speaker coupled to the coupler, and
wherein the speaker is configured to be turned on using the power received from the electronic apparatus and output a sound based on the audio signal received from the electronic apparatus.

6. The electronic apparatus of claim 5, wherein the coupler comprises at least two coupling grooves, and
wherein a coupling groove of a part of the coupler is coupled to a coupling protrusion of the display panel, and a coupling groove of another part of the coupler is coupled to a coupling protrusion of the speaker.

7. The electronic apparatus of claim 5, wherein the wireless power transmitter comprises a first wireless power transmitter configured to transmit power to the display panel and a second wireless power transmitter configured to transmit power to the speaker, and
wherein the processor is further configured to wirelessly transmit, to the display panel, power received from the external apparatus through the first wireless power transmitter, and wirelessly transmit, to the speaker, power received from the external apparatus through the second wireless power transmitter.

8. The electronic apparatus of claim 5, wherein the communicator comprises a wireless communication chip, and
wherein the processor is further configured to wirelessly transmit an audio signal received from the external apparatus to the speaker through the wireless communication chip.

9. The electronic apparatus of claim 5, further comprising:
a first magnetic switch; and
a second magnetic switch,
wherein the processor is further configured to, when the display panel is coupled to the coupler and the first magnetic switch is turned on, transmit power, to the display panel, received from the external apparatus, and when the speaker is coupled to the coupler and the second magnetic switch is turned on, transmit, to the speaker, power received from the external apparatus.

10. The electronic apparatus of claim 7, further comprising:
a first transistor, a second transistor, a third transistor, a fourth transistor, a fifth transistor, and a sixth transistor; and
an inverter integrated circuit (IC) configured to control a switching operation of the first transistor, the second transistor, the third transistor, the fourth transistor, the fifth transistor, and the sixth transistor,
wherein the first wireless power transmitter is configured to, when the display panel is coupled to the coupler and a first magnetic switch is turned on, generate wireless power according to a switching operation of the first transistor, the second transistor, the third transistor, and the fourth transistor controlled by the inverter IC, and
wherein the second wireless power transmitter is configured to, when the speaker is coupled to the coupler and a second magnetic switch is turned on, generate wireless power according to a switching operation of the first transistor, the second transistor, the fifth transistor, and the sixth transistor controlled by the inverter IC.

11. A method for controlling an electronic apparatus, the method comprising:
receiving power from an external apparatus that is connected to the electronic apparatus;
transmitting power to an external electronic apparatus that is attached through a coupler of the electronic apparatus; and
wirelessly transmitting a video signal received from the external apparatus to the external electronic apparatus.

12. The method of claim 11, wherein the coupler comprises at least one coupling groove that is coupled to at least one coupling protrusion of the external electronic apparatus.

13. The method of claim 11, wherein the external electronic apparatus comprises a display panel, and
wherein the display panel is configured to be turn on using the power received from the electronic apparatus and display a video based on the video signal.

14. The method of claim 11, wherein the transmitting power comprises, when the external electronic apparatus is coupled to the coupler and a magnetic switch is turned on, transmitting power received from the external apparatus to the external electronic apparatus.

15. The method of claim 11, comprising:
wirelessly transmitting an audio signal received from the external apparatus to the external electronic,
wherein the external electronic apparatus comprises a speaker coupled to the coupler, and
wherein the speaker is configured to be turned on using the power received from the electronic apparatus and output a sound based on the audio signal received from the electronic apparatus.

16. The method of claim 15, wherein the coupler comprises at least two coupling grooves, and
wherein a coupling groove of a part of the coupler is coupled to a coupling protrusion of the display panel, and a coupling groove of another part of the coupler is coupled to a coupling protrusion of the speaker.

17. The method of claim 15, wherein the transmitting power comprises wirelessly transmitting, to the display panel, power received from the external apparatus through a first wireless power transmitter, and wirelessly transmitting, to the speaker, power received from the external apparatus through a second wireless power transmitter.

18. The method of claim 15, wherein the transmitting the audio signal comprises wirelessly transmitting an audio signal received from the external apparatus to the speaker through a wireless communication chip.

19. The method of claim 15, wherein the transmitting power comprises:
when the display panel is coupled to the coupler and a first magnetic switch is turned on, transmitting power, to the display panel, received from the external apparatus, and
when the speaker is coupled to the coupler and a second magnetic switch is turned on, transmitting, to the speaker, power received from the external apparatus.

20. The method of claim 17, wherein the transmitting power comprises, when the display panel is coupled to the coupler and a first magnetic switch is turned on, generating wireless power according to a switching operation of a first transistor, a second transistor, a third transistor, and a fourth transistor controlled by an inverter integrated circuit (IC), and
when the speaker is coupled to the coupler and a second magnetic switch is turned on, generating wireless power according to a switching operation of the first transistor, the second transistor, a fifth transistor, and a sixth transistor transistors controlled by the inverter IC.

* * * * *